United States Patent [19]

Fountain

[11] 4,078,977
[45] Mar. 14, 1978

[54] SURFACE PREPARATION OF A DAMAGED BRAZE FOR REBRAZING

[76] Inventor: Laurence R. Fountain, 33 Brice Rd., West Springfield, Mass. 01089

[21] Appl. No.: 722,783

[22] Filed: Sep. 13, 1976

[51] Int. Cl.$^2$ .......................... C25D 5/34; C25D 5/48
[52] U.S. Cl. ................................ 204/32 R; 204/35 R; 204/38 B; 228/119
[58] Field of Search ................. 204/32 R, 38 B, 35 R, 204/16; 29/401 R; 228/119, 208

[56] References Cited

U.S. PATENT DOCUMENTS

| | | | |
|---|---|---|---|
| 2,207,808 | 7/1940 | Lamme | 204/35 R |
| 3,841,979 | 10/1974 | Arcilesi | 204/38 B |
| 3,970,237 | 7/1976 | Dockus | 228/208 |
| 4,011,981 | 3/1977 | Danna | 228/208 |

OTHER PUBLICATIONS

American Welding Society, Inc., Brazing Manual, Reinhold 1963 Chapter 3.

*Primary Examiner*—G. L. Kaplan
*Assistant Examiner*—William T. Leader
*Attorney, Agent, or Firm*—Chapin, Neal and Dempsey

[57] ABSTRACT

A method of preparing the surface of a damaged braze for rebrazing whereby the brazed article or part is cleaned, including the removal of excess braze, electrolessly pre-plated with a metal which is a constituent of the braze being repaired so as to penetrate into the damaged area of the braze and electrolytically plated with a metal which is a constituent of the braze being repaired, wherein said plating acts as a carrier and wetting agent for the braze to be used in the rebrazing operation.

7 Claims, No Drawings

SURFACE PREPARATION OF A DAMAGED BRAZE FOR REBRAZING

BACKGROUND

The present invention relates to a method for preparing the surface of a high temperature brazing alloy for additional braze.

In general, brazing may be defined as a metal joining process wherein the metals to be joined are heated to a temperature below their melting points and joined together by a non-ferrous filler metal, i.e., a braze, having a melting point of not lower than 800° F.

Such techniques, especially when a high temperature brazing alloy, such as a standard gold brazing alloy is employed, provide remarkably high bonding strength between the two metals that are joined. Consequently, such techniques have found extensive use in precision bonding situations, such as in the brazing of the vanes on rotors and stators of jet engines and the like.

While the use of brazing techniques such as described above has proved highly satisfactory, occasionally after extended use of an aircraft type engine cracks do appear in the brazing alloy used to bond parts together due to vibration. In such cases, it has been customary to break the bond between the joined parts by removing all of the braze and then rebrazing the parts together again. Such action is expensive and time consuming.

In accordance with the present invention a method is provided whereby a cracked or damaged braze is treated in place so as to be receptive to further brazing wherein said cracks are filled and the bond accordingly strengthened to the point of initial acceptability.

It is an object of the present invention to provide a method for filling cracks in braze.

It is another object of the present invention to provide a method of surface preparation for brazing.

It is a further object of the present invention to provide a method of repairing damaged brazed bonds joining two metal parts without the necessity of completely removing the braze.

The above and further objects and advantages of the present invention will become apparent in view of the following discussion.

As mentioned above, the basic tenet of the present invention is to prepare a surface for brazing. In particular, it involves the preparation of a damaged or cracked braze for rebrazing, wherein the damage or cracks may be filled with additional brazing alloy.

There are four basic steps for carrying out the method of the present invention: (1) cleaning, which includes the removal of excess braze and any oxides thereof from the adjacent parts: (2) electrolessly pre-plating the damaged or cracked surface; (3) electrolytically plating the damaged or cracked surface with a metal which is a component of the braze; and (4) cleaning the treated damage and/or cracks so as to remove any residue which might interfere with the rebrazing.

The first step of the method is to clean the braze and the adjacent parts area. In doing this, excess braze and oxides thereof are first removed by mechanical and/or chemical processes, such as those that are described in U.S. Pat. Nos. 3,819,494 and/or 3,958,984 to Laurence R. Fountain. Once the excess braze and any oxides thereof have been removed, the part is further cleaned with alkaline and acidic metal surface cleaning techniques which are well known in the art and which will be further described below.

The second step of the method is basically described as a pre-plating of the walls of the crack and/or damaged area with a metal which is a component of the braze material being repaired. While the pre-plating is done with a metal which is a component of the braze being repaired, it is essential that the pre-plating metal layer be deposited by electroless plating methods to insure penetration into the damaged area of the braze. However, in view of the expense involved in electroless plating, minor strikes, i.e., electroplating, may also be employed along with the electroless plating in order to inexpensively build up the pre-plate to a desired thickness and to activate the surface of the damaged area to be repaired.

If the electroplating is employed, the total deposit thereof amounts to only about 50 millionths of an inch and the deposit of the electroless plating is from about 0.0002 – 0.0005 inch.

The third step of the process is a plating operation with a metal which is a component of the braze being repaired. Basically, a standard plating bath is employed using electroplating methods. The metal deposit is preferably from .0002 - .0005 inch, and it acts as a wetting agent or carrier for the braze used in the final repair.

The last step of the process of the present invention prior to the actual repair with the brazing alloy is a cleaning step. Primarily, said cleaning involves the removal of any salt residue which may have been formed during the preceding step.

The following is an example of the method of the present invention wherein cracks in a brazing alloy comprising approximately 85% gold and 15% nickel are prepared for repair by rebrazing of the parts joined by the alloy:

1. Cleaning:
 (a) In accordance with ythe teachings of U.S. Pat. No. 3,958,984 mentioned above, excess braze and any oxides thereof are removed from the area to be repaired.
 (b) After the removal of the excess braze the part is cleaned as follows:
   (1) The part is immersed in an alkaline cleaner maintained from about 175° F for 5 – 10 minutes in the presence of a DC current.
   (2) Water rinse.
   (3) The part is immersed in a second cleaner, a cyanide chelated alkaline cleaner, at room temperature for 5 – 10 minutes in the presence of a periodically reversed DC current.
   (4) Water rinse.
   (5) The part is immersed in a weak acid bath of, for example, 5% $H_2SO_4$ or HCl so as to neutralize the surface thereof.
   (6) Water rinse.
   (7) The part is immersed in a 45% to 65% HCl bath for from 1 - 10 minutes in the presence of a DC current in order to depassivate the surface of the part being treated and provide a light etching thereof.
   (8) Water rinse.

2. At this point in the process the part is ready to be preplated. Accordingly, the part is electrolessly plated in a Nickel/Boron plating bath containing about 97% Ni for 15 – 45 minutes at about 140° – 160° F, followed by a water rinse.

An optional pre-plating sequence employing electrolytic deposition along with the electroless depositions is as follows:

(a) The part is immersed in a plating bath containing 32 oz/gal of $NiCl_2$ and 16 oz/gal of HCl and maintained at room temperature for a period of from about 2 ½ - 10 minutes in the presence of a DC current. This pre-plating bath deposits from about 25 - 50 millionths of an inch of nickel on said part.

(b) Water rinse.

(c) The part is electrolessly plated in a Nickel/Boron plating bath containing about 97% Ni for 15 - 45 minutes at about 140° F - 160° F.

(d) Water rinse.

(e) The part is immersed in a weak acid solution containing about 10% $H_2SO_4$ for 1 - 3 minutes at room temperature in order to activate the surface thereof for the next pre-plating bath.

(f) Water rinse.

(g) Repeat step (a) of this section.

(h) Water rinse.

3. Subsequent to the above, the debrazed, cleaned and preplated part is ready for a standard plating wherein a salt of sulfamic acid, such as nickel sulfamate is employed as the basis of the plating bath. The plating operation is carried out at room temperature to temperatures of about 140° F for about 10 - 30 minutes in the presence of a DC current. Subsequent to the plating operation the part is water rinsed.

4. The last step in the instant method includes the cleaning of the part in order to remove any salt residue that may have been formed during the plating operation. Generally this is accomplished by immersing the part in a medium which is a solvent for the salts so formed, i.e., such as hot water.

Following the above treatment, the part may be rebrazed using standard high temperature brazing techniques.

What is claimed is:

1. A method of preparing the surface of a damaged braze of a brazed part for rebrazing, said method comprising cleaning said surface so as to remove excess braze, any oxides thereof and other deposits from said surface, electrolessly pre-plating said surface with a plating metal which is a component of the damaged braze, electrolytically plating said surface with a metal which is a component of the damaged braze and cleaning said surface with a solvent to remove any residue formed on said surface during said plating step.

2. The method of claim 1 wherein said pre-plating step further includes electrolytically depositing additional layers of a metal which is a component of the damaged braze on said surface.

3. The method of claim 1 wherein said first cleaning includes treating said surface in an alkaline bath in the presence of a DC current, neutralizing said surface with a weak acid and depassivating said surface with a strong acid in the presence of a DC current.

4. The method of claim 1 wherein said electroless pre-plating comprises immersing said brazed part in a plating bath for 15 - 45 minutes at a temperature of from about 140° F to 160° F.

5. The method of claim 1 wherein said electrolytic plating comprises immersing said brazed part in a plating bath for 10 - 30 minutes at a temperature of from about room temperature to about 140° F in the presence of a DC current.

6. The method of claim 1 wherein said solvent used for cleaning residue formed on said surface as a result of said plating step is water.

7. The method of claim 1 wherein said braze comprises an alloy of gold and nickel.

* * * * *